US010795709B2

(12) United States Patent
Glessner et al.

(10) Patent No.: US 10,795,709 B2
(45) Date of Patent: Oct. 6, 2020

(54) SYSTEMS AND METHOD FOR DEPLOYING, SECURING, AND MAINTAINING COMPUTER-BASED ANALYTIC ENVIRONMENTS

(71) Applicant: The MITRE Corporation, McLean, VA (US)

(72) Inventors: Gary D. Glessner, McLean, VA (US); Robert A. Case, McLean, VA (US); Ronald T. Sienknecht, Jr., McLean, VA (US); William R. Kinkel, McLean, VA (US); John W. Ferguson, McLean, VA (US); Alexander H. Ethier, McLean, VA (US)

(73) Assignee: The MITRE Corporation, McLean, VA (US)

(*) Notice: Subject to any disclaimer, the term of this patent is extended or adjusted under 35 U.S.C. 154(b) by 74 days.

(21) Appl. No.: 15/716,052

(22) Filed: Sep. 26, 2017

(65) Prior Publication Data

US 2019/0095230 A1    Mar. 28, 2019

(51) Int. Cl.
*G06F 9/455*      (2018.01)
*H04L 29/06*     (2006.01)
(Continued)

(52) U.S. Cl.
CPC ...... *G06F 9/45558* (2013.01); *G06F 9/44505* (2013.01); *G06F 9/5072* (2013.01);
(Continued)

(58) Field of Classification Search
CPC .................................. G06F 21/00; G06F 21/50
See application file for complete search history.

(56) References Cited

U.S. PATENT DOCUMENTS 8,661,062 B1 *   2/2014   Jamail ................. H04L 63/1416
                                                                 707/802
9,386,035 B2 *   7/2016   Baliga ................... H04L 63/145
(Continued)

OTHER PUBLICATIONS

International Search Report and Written Opinion dated Nov. 26, 2018, directed to PCT Application No. PCT/US2018/052931; 18 pages.

(Continued)

*Primary Examiner* — Ponnoreay Pich
(74) *Attorney, Agent, or Firm* — Morrison & Foerster LLP

(57) ABSTRACT

A method for automatically provisioning a secure data analytic environment is provided. In one or more embodiments, the method can include receiving one or more specifications regarding the data analytic environment to be created from a user, and using the specifications to automatically implement the data analytic environment on a cloud computing environment. In one or more embodiments, the created data analytic environment can be analyzed to determine if the environment is compliant with one or more computing security rules. If the environment is found to be compliant, then the provisioning scripts can be used to generate clones of the originally created analytic environment or modify the pre-existing data analytic environment without requiring the newly created or modified environment to undergo the level of security scrutiny provided when the original analytic environment was created.

28 Claims, 10 Drawing Sheets

(51) Int. Cl.
 *G06F 9/50* (2006.01)
 *G06F 9/445* (2018.01)
 *G06F 21/57* (2013.01)
 *G06F 21/51* (2013.01)
 *H04L 29/08* (2006.01)

(52) U.S. Cl.
 CPC .............. *G06F 21/51* (2013.01); *G06F 21/57* (2013.01); *G06F 21/575* (2013.01); *G06F 21/577* (2013.01); *H04L 63/1433* (2013.01); *G06F 2009/45562* (2013.01); *G06F 2221/033* (2013.01); *G06F 2221/034* (2013.01); *H04L 67/10* (2013.01)

(56) References Cited

U.S. PATENT DOCUMENTS

| | | | |
|---|---|---|---|
| 9,477,836 B1 * | 10/2016 | Ramam | ............... G06F 21/6263 |
| 9,753,834 B1 | 9/2017 | Tang et al. | |
| 2015/0242631 A1 | 8/2015 | Cabrera et al. | |
| 2016/0173524 A1 | 6/2016 | Lietz et al. | |
| 2016/0218926 A1 * | 7/2016 | Johnson | .............. H04L 41/0816 |

OTHER PUBLICATIONS

Ross, Ron et al. (2005) "Recommended Security Controls for Federal Information Systems," NIST Special Publication 800-53, Information Security; 123 pages.

\* cited by examiner

SYSTEMS AND METHOD FOR DEPLOYING, SECURING, AND MAINTAINING COMPUTER-BASED ANALYTIC ENVIRONMENTS

FIELD OF THE DISCLOSURE

This disclosure relates to systems and methods for deploying, securing, and maintaining computer-based analytic environments. These systems and method can be used to accelerate the process by which computer-based analytics are created and provisioned.

BACKGROUND OF THE DISCLOSURE

The memory storage capacities and processing speeds of computers are continually increasing, making it possible for computers to ingest and store large amounts of data. Such data sets can often be so large and complex that traditional data processing application software may be inadequate to handle the volume and speed required to make analysis of the data set viable. Large data sets can also create further challenges for analysis software including the capture, storage, analysis, data curation, search, sharing, transfer, visualization, querying and data security.

Furthermore, there is a desire to generate value from the collection of large data sets. Applying predictive analytics and behavior analytics to large data sets can be of value insofar as the large data sets can be used to spot aggregate trends and correlations that may not otherwise be yielded using limited or small data sets.

Implementing analytics to large data sets can often require large and complex computing environments. Such computing environments can often include computing resources dedicated to ingesting and storing large data sets, software dedicated to provisioning computing resources for large bandwidth analytical tasks, and resources dedicated to ensuring that the data stored in the system and the analytical process is secure and is not vulnerable to external hackers or malicious users of the system.

Often times the time needed to create the needed computing environment can cause delays in the analysis of large data sets. The resources required to build a computing environment that is capable of efficiently handling large data sets and implementing analysis can often takes weeks and or months and the cost can include the expenditure of human capital. Furthermore, the process of implementing adequate security protocols (which are often mandated by standards) can further delay the process. That can prove to be unacceptable to an enterprise who desires an ability to build and modify secured environments quickly, and overall maintain computing agility.

Thus a system and method that can streamline the process of provisioning and building a data analytics environment and can further streamline the security authorization process can be useful and desirable to reduce the cost and time associated with building such systems.

SUMMARY OF THE DISCLOSURE

Accordingly, systems and methods for building, deploying, and maintaining computer-based analytic environments are provided. In one example, the system (also referred to as an automatic provisioning framework) provides a user-interface that allows a user to specify and customize the analytical environment that they wish to create. The system can then take the user's specification of the analytical computing environment and in one example, create a new virtual private cloud to host the provisioning scripts associated with building the environment. The system and methods can also automatically build and maintain security infrastructure that is compliant with various enterprise level security requirements and protocols, thus reducing the amount of time and effort required to assess a new analytic computing environment for security compliance.

The automatic provisioning framework can accelerate secure big data analytics in the cloud by creating analytic cells that include the infrastructure, analysis tools, data engines, and technical security controls that may be needed for sensitive big data analytics. The automated provisioning framework can be configured to deploy complete environments (i.e., storage, compute, network/zones, systems/clusters, apps, IT and security management, as examples) for use cases such as Data fusion, Federated analytics, Tool evaluation and prototyping, and Model-driven engineering.

DETAILED DESCRIPTION

Figure 1:
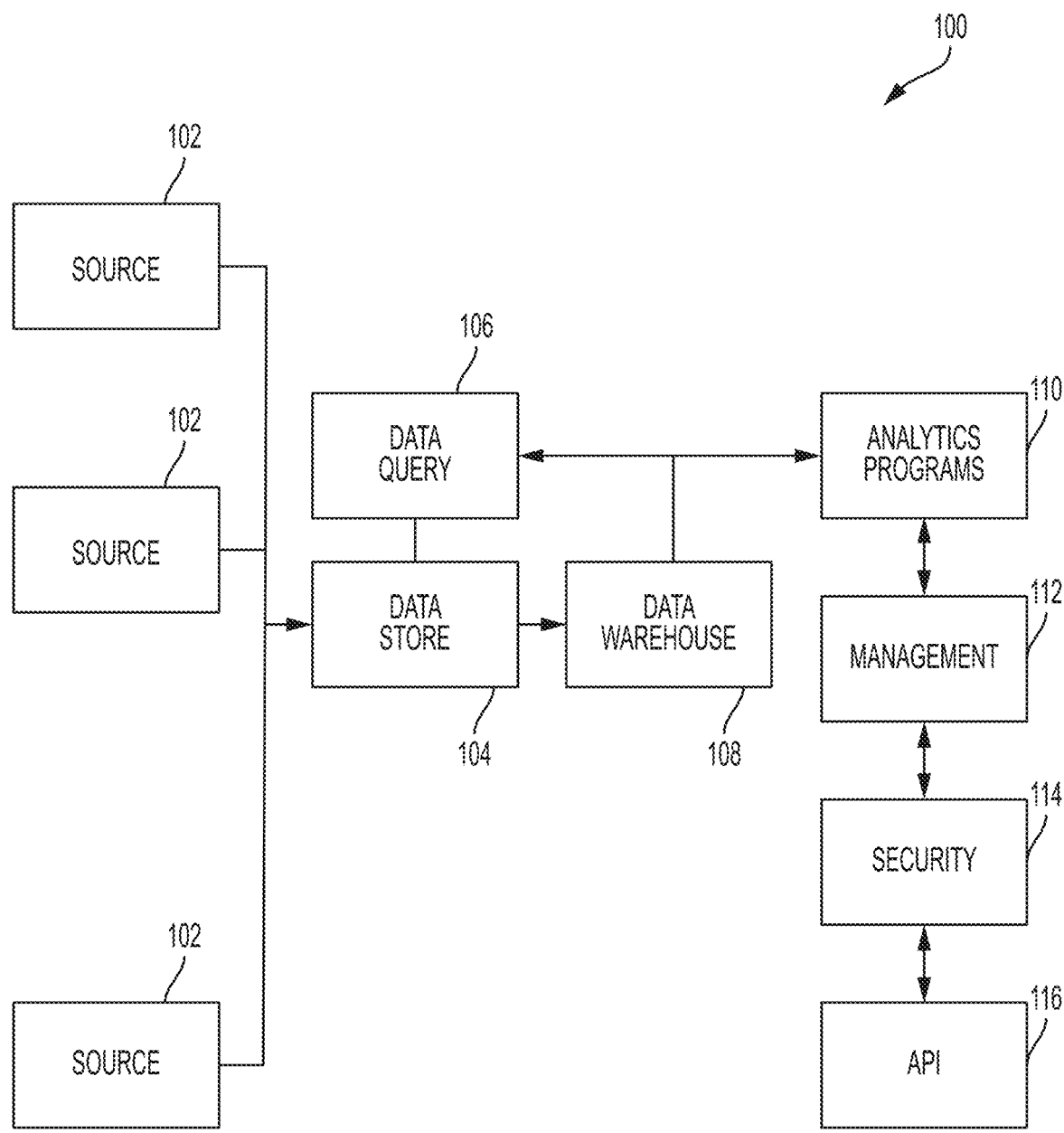
FIG. 1 illustrates an exemplary data analytics architecture according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for building, deploying, and maintaining computer-based analytic environments. In one example, the system provides a user-interface that allows a user to specify and customize the analytical environment that they wish to create. The system can then take the user's specification of the analytical computing environment and in one example, create a new virtual private cloud to host the provisioning scripts associated with building the environment. The system and methods can also automatically build and maintain security infrastructure that is compliant with various enterprise level security requirements and protocols, thus reducing the amount of time and effort required to assess a new analytic computing environment for security compliance. In one or more examples, once an analytic cell is approved for use, the system and methods described herein, can be used to re-create a pre-approved analytic environment in essence cloning it.

Creating, implementing, and securing large computer-based analytical systems can be an arduous process that expends a great deal of money, time, and effort in order to build a system that not only serves the needs of the user community requisitioning the system but is also compliant with required security protocols.

FIG. 1 illustrates an exemplary data analytics architecture according to examples of the disclosure. The system 100 is only provided as an example and is not meant to comprehensively detail the components that may be required to provision and maintain a data analytics computing environment. The system 100 can include one or more sources 102. The sources 102 can represent the sources of data being ingested into the system 100. In some example, sources 102 can include data garnered from various websites, mobile phones, online applications, cloud data, etc.

The data from sources 102 can be stored in a data store 104. Data store 104 can represent the physical memory on which the data 102 is stored, but in some examples can also represent the software used to manage a distributed storage environment. As an example data store 104 can utilize Apache Hadoop™ an open source software framework used for the distributed storage and processing of large data sets.

System 100 can also include a data querying platform 106. Data querying platform 106 can organize and process queries to any data stored in data store 104. In general, data querying platform 106 can act as a link between the ingested data and any analytics program (discussed in further detail below) that processes queries to the data from external analytics programs. The system 100 can also include a data warehouse 108. Data warehouse 108 can include any data that is required by the local network of an enterprise that is not ingested from external sources. In other words, data warehouse 108 can provide storage for data that is required in the operation of any of an enterprise's computing operations.

System 100 can also include an analytics engine 110. Analytics engine 110 can represent predictive analytics software that uses the data ingested by sources 102 to make various predictions and generate various correlations as directed by a user of the system 100. As an example, analytics engine 110 can include a Hortonworks™ Data Platform that utilizes Hadoop™, Hive™, HBase™, Spark™, and other various analytic engines that an enterprise may want to utilize as parts of its data analytics operation.

System 100 may also include a management system 112. Management system 112 may include any software that is required for the provisioning, monitoring, and management of the system 100. Examples of software that can be utilized by management system 112 include Ansible™, FreeIPA™ and Ambari™. In one or more examples, the management system 112 may include software that can be used to re-generate (i.e., clone) computing instances that have been pre-approved for an enterprise.

System 100 may also include security software 114. Security software 114 can perform various security functionality such as vulnerability scans, anti-virus, malware detection, intrusion detection, policy enforcement, event monitoring and auditing, etc., to ensure that the system 100 is not vulnerable to any malicious attacks from outside persons or entities and conforms to security expectations. Finally, the system 100 can also include an application programming interface (API) that can provide an interface for users of the system to interact with the system.

The system 100 can be cumbersome to build and secure from scratch. A person or teams of people may be required to provision the hardware and software components required to create a desired environment and to establish the required level of security protection. This process can often take weeks or months and can hinder the ability of an enterprise to quickly implement a desired analytics system.

An automated provisioning framework that accelerates secure big data analytics in the cloud is provided below. The provisioning system can create analytic cells that can include the infrastructure, analysis tools, data engines, and technical security controls that may be required for sensitive big data analytics. As an extensible framework, the automated provisioning framework can be tailored to deploy complete environments (storage, compute, network/zones, systems/clusters, operating systems, business/analytical applications, IT and security management) for use cases such as Data fusion, Federated analytics, Tool evaluation/prototyping, and Model-driven engineering. The automated provisioning framework can reduce the IT provisioning time for complex environments and can reduce the security authorization timeframe, while providing for highly reusable templates. Further, the automated provisioning framework can allow for a shift in security compliance paradigms by allowing a shift from per-instance compliance checklists to allow for security compliance checking to be applied on the generative process itself. The automated provisioning framework can provide verifiable deployments, built-in FedRAMP-aligned security controls (the framework can also be tailored to meet other standards such as National Institute of Standards and Technology Special Publication 800-53, *Security and Privacy Controls for Federal Information Systems and Organizations* and other leading security standards based on risk management), and advances in the security paradigm.

As will be further described below, the automatic provisioning framework can integrate a plurality of technologies and can automatically deploy not just an analytic stack but the entire scalable environment (storage, compute, network/zones, systems, apps, etc.) in a secure and repeatable manner. The automated provisioning framework does this in a consistent and verifiable manner by templating/scripting the entire process, thus providing reusability and portability benefits not found in conventional tools tied to a single Cloud Service Provider or software vendor.

Figure 2:
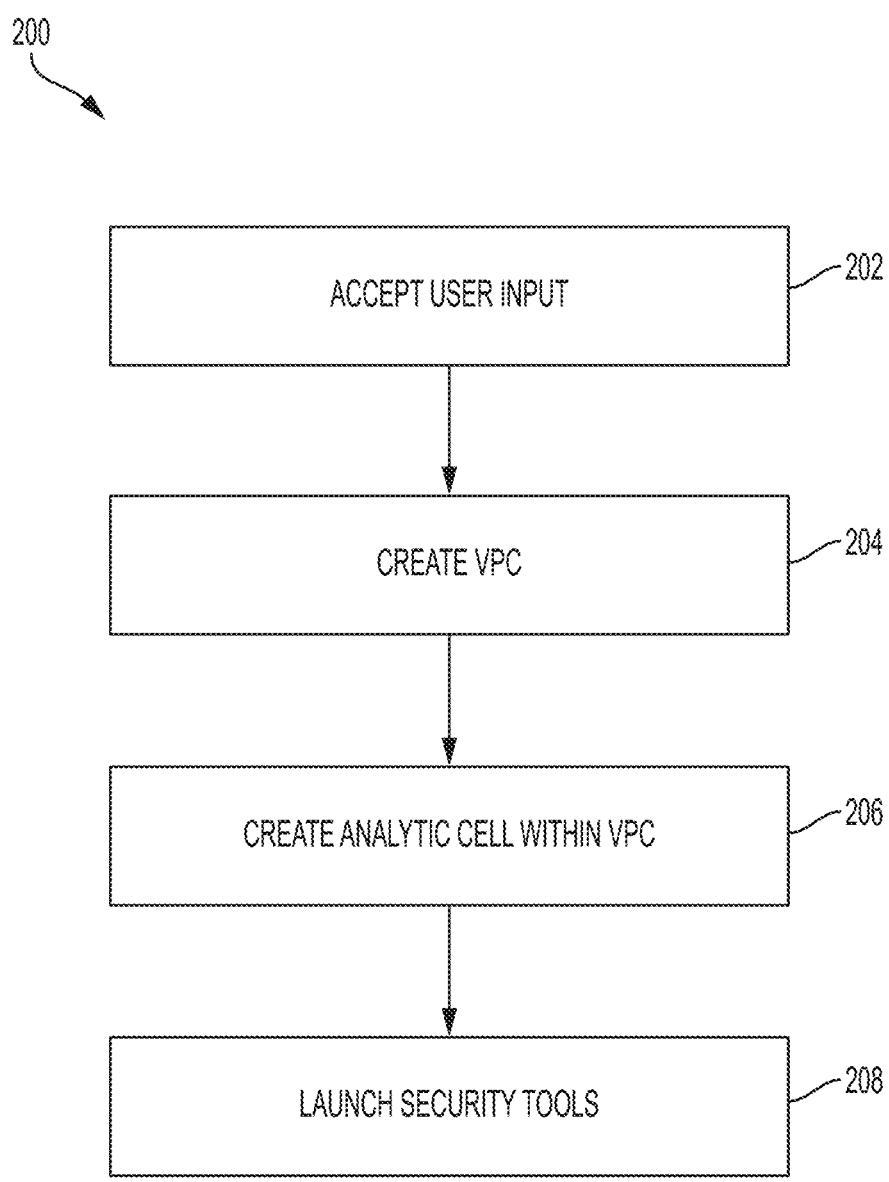
FIG. 2 illustrates an exemplary provisioning framework process according to examples of the disclosure.

FIG. 2 illustrates an exemplary provisioning framework process according to examples of the disclosure. The process 200 can be employed to specify and automatically provision a data analytic system. The process 200 can start at step 202, wherein a user can specify the particulars of the environment that they wish to create. The user's specification of the environment they wish to create can be communicated in multiple ways. In one or more examples, the user can complete a configuration file or use human-friendly programming language (Yaml) to specify the analytical environment they wish to create.

In some examples, a user can define the scope of an analytics environment by specifying whether they desire to have the environment internet-open or closed. They can specify the compute cluster sizes and well as specify any desired keys they wish to use in conjunction with the operation and maintenance of the analytic environment. Examples of user-definable environment specifications include: Which analytical tools are installed; Which security tools and policies are enforced; Cluster size definitions which can be broken down into Number of virtual machines, Disk space for each virtual machine, RAM (memory) for each virtual machine, Virtual Processing power (vCPUs) for each virtual machine; Initial user accounts and login access keys; Administrative passwords for certain analytical and security tools; Analytical engine performance tuning and security parameters; Base operating system for virtual machines; and Version of bundled software package dependencies to be installed.

Once the user has provided the specifications of the analytical environment they wish to create, the process can move to step 204 wherein a new isolated user-specific enclave, or Virtual Private Cloud (VPC) in the example of Amazon Web Services, can be created on a cloud service provider Infrastructure as a Service. A VPC, in some examples, can represent a configurable pool of computing resources that are allocated within a public cloud environment for specific (and isolated) use by a given customer. A VPC user can be isolated from other users of the same public cloud service through the allocation of a private internet protocol (IP) subnet, and a virtual communication construct such as a local area network (LAN). A VPC can establish a single continuous address range. All virtual machines within the VPC can have a single IP address assigned within that range. The VPC can allow for the creation of multiple computing environments by breaking the single contiguous address range into multiple smaller contiguous address ranges, called subnets. These address ranges can be used to control the network communication controls such as who is allowed to talk to whom or how is data routed from one subnet to another. Each subnet can be designated as a unique zone within an analytical cell. A zone can, in one or more examples, be implemented as a host within a virtual machine or virtual private cloude. Each zone can be tailored for a different use case and user role. For example, analysts may use the user and analytics zones, while system adminstrators may use the management zone, and security professionals may use the security zone. The analytic cell establishes a plurality of network rules which can limit and controls the network connections between zones. Segregating and tightly controlling the communication between zones can make it much harder for an attacker to penetrate a new zone from an already compromised zone. By providing isolation between the VPC and other cloud users, the use of VPC ensures privacy and security in data between different entities utilizing the cloud.

Once the VPC has been created, the process can move to step 206, wherein an analytic cell can be created within the VPC and the automated provisioning framework provisioning scripts (discussed below) can be executed. An analytic cell can describe a bounded, isolated computing environment that can be inclusive of the tools and security functions required to secure and maintain the operation of the environment. Finally, once the analytic cell has been created within the VPC, the process can move on to step 208 wherein security tools can be launched for the purpose of validating the newly created analytic computing environment from a security standpoint and providing required continuous monitoring.

In one example, the provisioning scripts can create one or more hosts within the VPC, wherein each host can be dedicated to installing, running, and maintaining software associated with the creation of an analytic cell (described in further detail below). Based on the specifications entered by the user into a template, the provisioning scripts can determine what hosts need to be provisioned, and generate the commands to the cloud service for the creation of the hosts.

Figure 3:
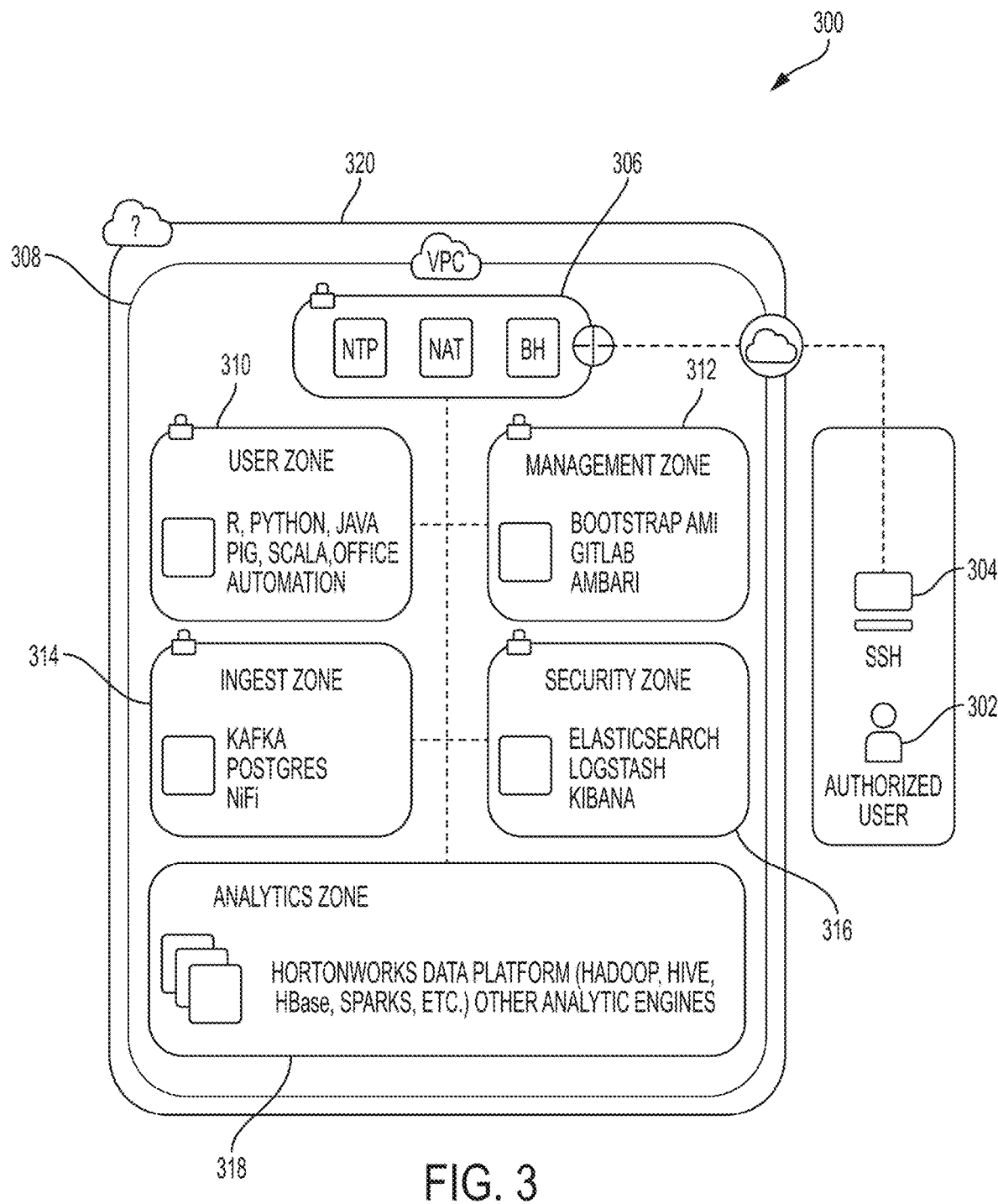
FIG. 3 illustrates an exemplary analytic cell created by an automated provisioning framework according to examples of the disclosure.

FIG. 3 illustrates an exemplary analytic cell created by an automated provisioning framework according to examples of the disclosure. In the system 300, and in one example, an authorized user 302 of the system can access the analytic cell 308 contained within a cloud service 320 through the use of Secure Shell (SSH) that allows the user to remote login to the VPC.

The analytic cell 308 located within the cloud service 320 can include a plurality of work zones. The most notable zones are listed in the diagram: 306, 310, 312, 314, 316, and 318 are based on specified user needs. Work zones can refer to areas within a VPC that have segregated functionality to enforce security control and to improve an analytic cell's performance, operations and maintenance. In the example of FIG. 3, the system 300 can include a user zone 310, a management zone 312, an ingest zone 314, a security zone 316, and an analytics zone 318. Additional zones within Symphony that are not shown in the diagram are: database zone, middleware zone, appserver zone, and other zones. Users who extend Symphony can make use of these zones as they see fit.

In the system 300, the user zone 310 can in essence represent the portion of the system that the end user (such as analyst, data scientist, domain expert) interacts with to operate the system 300. In other words, the user zone 310 can represent the "data scientist desktop" and can allow the user to write code or run programs to perform the type of analytics on the data to meet business needs. The user zone can include, for example, such tools and applications as Python, R, Java, Apache Pig (a programming platform for creating analytic programs on Apache Hadoop), Jupyter, RStudio, Scala, and Office or any other program that allows a user to create analytics programs for use in the analytic cell.

System 300 can also include an ingest zone 314. The ingest zone 314 can be configured to allow for the data from a plurality of sources to be loaded into the system 300. The ingest zone can include software that can provide platforms for handling real-time data feeds. The software running in the ingest zone can provide scalable queuing capabilities and produce transaction logs of all data coming into the system. The ingest zone can, in some examples, include software that can receive data from external sources and partition the data into different partitions sorted by various topics. The programs can also index and timestamp incoming data. Examples of software that can be a part of the ingest zone and can perform the above described functionality can include Hortonworks™ DataFlow™ or Apache Kafka™.

In some examples of the disclosure, the ingest zone 314 can include programs that can provision and maintain databases of the data ingested from the external sources. The data base management programs can be configured to store data securely and return data in response to queries from various external systems. In some examples, the ingest zone 314 can include programs configured to automate the flow of data between systems, thereby allow data stored in the databases to flow freely to other zones of the system 300. As an example, the ingest zone 314 can include Postgres™ and NiFi™ as part of the software applications maintained in the ingest zone 314.

The system 300 can also include a management zone 312. The management zone houses the Management System 112 described above. Management zone 312 can include programs used by system administrators to deal with the management of the analytic environment. For instance, software hosted and operated within the management zone 312 can include software that is configured to perform configuration management of the data analytic system. Modifications, such as deploying new instances in a zone or deploying new code to the VPC, are administered through the management zone. The management zone also allows network access to many other administrative GUIs in the cluster. The management zone can include an instance equipped with a desktop environment with a browser to allow access and control of the various web-based administrative panels throughout the VPC. A bootstrap instance in the management zone is also deployed with all the necessary tooling to generate new Symphony™ instances (System 100). As an example, management zone 312 can include software such as Ansible and Firefox.

The system 300 can include a security zone 316. The security zone houses the security software 114 described above. Security zone 316 can include programs that deal with the security features of the analytic environment, and specifically can include software that protects the environment from malicious activity and ensures the required security posture. The security zone 316 can include software that can ensure customer specific-security and privacy safeguards are in place and maintained throughout the operation of the system, for example, vulnerability scans, anti-virus scans, malware detection, intrusion detection, policy enforcement, and event monitoring and auditing. Furthermore, and as discussed in further detail below, the security zone 316 can include software that is configured to ensure that the system is compliant with one or more security regulations such as the Federal Information Security Management Act (FISMA) which mandates a required framework to protect government information, operations, and assets. The security zone 316 can include such programs as Elasticsearch™, Logstash™, and Kibana™.

The security zone may also include tools that can generate automated reports on the security status of the VPC. These automated reports can aggregate the existing security vulnerabilities and unauthorized changes across all instances. The reports can be automatically entered into a ticketing system where the remediation status of the scans can be tracked and managed. These tools can be accessed via a desktop environment hosted in the security zone. The security tools can include management related tools to help security professionals with their day to day duties. Security professionals may generate new scan reports or take actions in the VPC by using a job scheduler with a graphical interface. The security tools can include an event-driven automation tool that can be extended to support additional security needs. Various workflows, such as initiating a patch on all machines, can be programmed into the automation tool and connected to a trigger that will only execute the code when desirable conditions are met. The security tools described above can include such programs as Jira™, Stackstorm™, Greenbone Security Assistant™, and OpenVAS™.

System 300 can also include an analytic zone 318. The analytic zone houses the Analytic Engines 110 described above. The analytical engines allow for the distributed processing of typically Terabyte to Petabyte and beyond data sizes. These engines can efficiently execute large scale jobs that run across all the nodes and data in parallel. While all zones can be extended with additional instances, the analytics zone supports up to thousands of additional worker instances to speed up processing time. The user zone contains GUI interfaces that show a full history of the jobs that have run and are running. This history provides the job status, logs on individual machines, as well as other metrics such as time elapsed or bytes processed. The analytics zone 318 can include such programs as the Hortonworks™ Data Management Platform (HDP™) which bundles several open source big data processing tools including: Spark™, HDFS™, Zookeeper™, etc.

The provisioning of the analytic cell can be accomplished through the use of various templates and pre-defined scripts that can be executed by the automated provisioning framework. The templates can take in user's inputs and in combination with various scripts can provision an analytic cell based on a user's specification. The framework uses tag-based templating, event-driven automation, and other methods described below.

While the provisioning scripts can create the VPC and its associated hosts as described above, in order to monitor the analytic cell and modify it, should it become necessary, the automated provisioning framework may require a method for keeping track of which hosts created by the cloud service provider correspond with certain functionalities within the analytic cell. In order to provision and maintain a modular and dynamic environment, so that the framework can be used to add, change, or remove nodes/hosts, a method for abstractly naming the hosts within the analytic cell as well as their attributes, capabilities, and configuration types can be useful.

Figure 4:
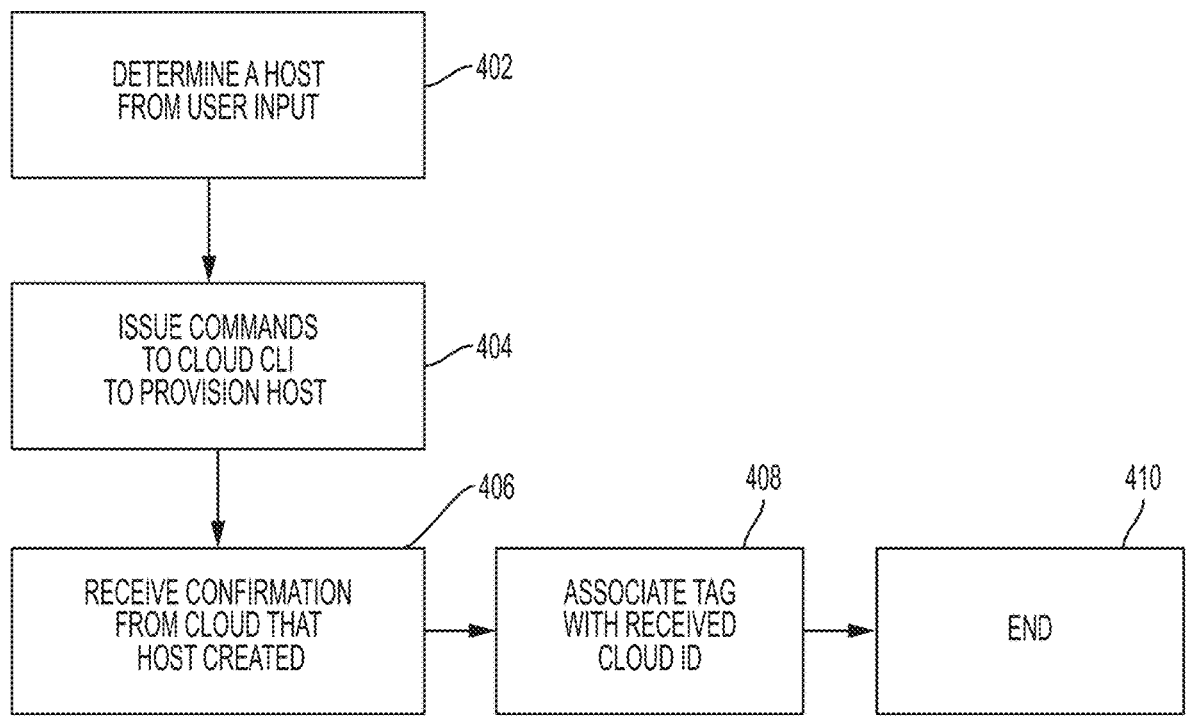
FIG. 4 illustrates an exemplary method for tagging hosts in an analytic cell implemented by an automated provisioning framework according to examples of the disclosure.

One such method can be to employ a tag-based identification of hosts/nodes created by the framework on the cloud service provider infrastructure in response to the provisioning scripts. FIG. 4 illustrates an exemplary method for tagging hosts in an analytic cell implemented by an automated provisioning framework according to examples of the disclosure. The method 400 can begin with step 402 wherein a needed host, and specific capabilities within a host are determined based on a user's inputted specifications. As discussed above, a user can provide a plurality of specifications that define the type of analytic cell that they wish to provision. For example, the user can indicate whether they desire to have the environment internet-open or closed. They can specify the compute cluster sizes and well as specify any desired keys they wish to use in conjunction with the operation and maintenance of the analytic environment. Based on these specifications, at step 402, the automated provisioning framework can generate scripts that can automatically create the requested environment. As part of the generation of the scripts, the automated provisioning framework can determine the number of hosts that need to be created within a VPC and any capabilities within a specific host that need to be created based on the user's specification.

As an example, if a user specifies that they want a closed internet analytic cell, the automated provisioning framework can create a security host and load software configured to maintain a closed internet environment from a local repository.

As another example, if a user specifies that they want a development sandbox with fewer nodes and no logging overhead, the automated provisioning framework will create just the required hosts and exclude undesired components.

Once the hosts and partition within the hosts have been determined, the method 400 can move to step 404 wherein the automated provisioning framework can issue commands to a command line interface, web endpoint, or API of a cloud service provider to provision the hosts and capabilities within hosts in the analytic cell. The commands generated by the automated provisioning framework can be specific to the cloud service provider upon which the VPC is to be provisioned. Examples of cloud service providers include Amazon AWS™, Microsoft Azure™, and Google Cloud™.

Once the commands have been issued, the process can move to step 406, wherein the automated provisioning framework can wait until a confirmation is received from the cloud service provider that the requested hosts/capabilities within hosts has been created. As part of the confirmation, the cloud service can provide an identification (such as an IP address and node ID) that can identify the specific identity of the host and the specific identity of the partition within a host that has been created.

Once the confirmation and ID is received from the cloud service provider indicating that the host and/or capabilities within the host has been created, the method 400 can move to step 408 wherein a tag can be created that associates a specific requisitioned host, with the ID of the created received from the cloud service provider. As an example, if at step 404 the automated provisioning framework issued a command to a cloud service provider to create a host for security management of the analytic cell within the VPC, and then received a confirmation from the cloud service provider that the host was created along with an IP address (at step 406 where the host is located, then at step 408 the automated provisioning software can associate a tag with the received IP address, linking the host with security related tasks). In addition, the automated provisioning framework can insert the tag name for nodes into the Domain Name System (DNS) so all machines and tools can be discoverable to other services within the analytic cell.

Below is an example code sample for the software provisioning on an analytic cell:

```
- name: Install wget and unzip
    yum:
        name: "wget,unzip"
        state: "present"
    sudo: True
- name: Cleanse Workdir
    file:
        path: "/var/tmp/awscli__install"
        state: "absent"
- name: Create Workdir
    file:
        path: "/var/tmp/awscli__install"
        state: "directory"
```

The above code can specify 3 separate tasks to be performed on nodes in the analytic cell: (1) installing wget and unzip Linux utilities (means to retrieve and install software packages from the internet or a specified repository), (2) cleansing the working directory, and (3) creating a working directory.

In response to the associated creation of computing infrastructure on the cloud, and the identification of hosts by the cloud, the automated provisioning software can display the result of the scripts it is executing. The resulting logs are produced below when the code in above is reached during automated execution:

---
TASK [awscli: Install wget and unzip] ****
Ok: [greenfield4.mitre.org]
Ok: [greenfield5.mitre.org]
Ok: [greenfield6.mitre.org]
TASK [awscli: Cleanse Workdir]
Ok: [greenfield4.mitre.org]
Ok: [greenfield5.mitre.org]
Ok: [greenfield6.mitre.org]
TASK [awscli: Create Workdir]
Changed: [greenfield4.mitre.org]
Changed: [greenfield5.mitre.org]
Changed: [greenfield6.mitre.org]
---

In this example, the name of the task is shown along with additional descriptions of the task. Each task displays a list of nodes where it took effect and shows the result of each task.

The automated provisioning system can use a tag-based identification system to map a specific set of tasks to a specific set of hosts. The example code at above is grouped together in what is called a role. The below code shows how roles can be mapped to tags associated with hosts in this example:

---
- name: Install awscli
  hosts: ["ntp", "analytics-user-workstation", "analytics-ambari-master"]
  roles:
     - awscli
---

The mapping can start with a name, 'Install awscli' and then can list a set of hosts. Each item in the list is a tag. When building the analytic cell, all hosts can be configured with a set of tags. Any newly created hosts can be assigned an initial set of tags. In this example, when this block of code is reached, only the hosts with the three tags ('ntp', 'analytics-user-workstation, and 'analytics-ambari-master') can have the awscli role executed on them. Referring back to the output above it can be deduced that three listed hosts were tagged with at least one of the three listed tags.

The automated provisioning framework can dynamically reassign the set of tags on the hosts. This is useful when the hosts need to change their role (i.e., purpose or function of installed software) within the analytic cell (such as different configuration of nodes in a cluster) or when new hosts are added and/or removed; after reconfiguring the tag assignment in the configurations, the same code can be run again and the desired code execution will run against a new set of computed hosts. This unique dynamic tagging capability can be implemented using a custom execution engine module that can run before all other tasking.

In one or more examples, when an already provisioned VPC is being modified, each component of the VPC that is to be newly created can have a tag applied to it in the provisioning script. The tag can be used to identify each instance of hardware or software provisioned in the VPC. The provisioning framework can request the cloud provider to modify existing virtual machines on the VPC to match any new hardware specifications and subnets implicated by changes to the existing VPC. For any newly created virtual machines that are created as part of the modification, the provisioning framework can store the cloud provider assigned identification number and the internet protocol (IP) address in a file in memory. Each tagged hardware or software can then be mapped to the cloud IDs and IP addresses stored in the file. Thus in the future, if the provisioning framework needs to install software on any of the hosts within the VPC, it can do so by using the assigned tags which then can be used to find the IP address where the hosts resides.

While cloud service providers offer the promise of a scalable and available infrastructure as a service, in reality, there are frequently minor and occasionally major perturbations to the underlying infrastructure that create issues with provisioning or maintaining a cloud-based system. For example, the availability of any given node at any given time varies, and other anomalous behaviors can pose issues when trying to scale up a system or create a resilient capability. Further, to obtain the full benefit of on-demand IT from cloud service providers, one must be able to not just respond to but actively manage a dynamic environment in which nodes and resources are added, modified, or deleted as needed in response to customer needs.

To create a scalable and resilient automated provisioning framework, a specialized execution capability to provide robust error handling and failure mode mitigation can be implemented. This capability can feature the ability to pause the runtime execution of the automated provisioning framework in the middle of software provisioning when a critical error is encountered. Once paused, the capability can allow for a number of mitigation strategies to be applied. In one or more embodiments, the capability can first try automatic error resolution strategies such as retrying multiple times and reporting the event to a centralized error management system. The centralized error management system can have rules in place to decide how to automatically respond to such an error report. The capability can also allow human input to either ignore the error and continue, abort the execution entirely, or enter a debug mode where internal variables within the execution engine could be modified. This capability can engender a highly reliable at-scale performance in multiple node clusters and in situations when intermittent node availability or anomalous infrastructure conditions exist.

Returning to FIG. 2, once the analytic cell has been provisioned within the VPC at step 206, the process can move to step 208, wherein in one or more security processes can be automatically launched to build the infrastructure on the analytic cell so as to secure the analytic cell from external operational threats. The security processes can be serve two functions: (1) security authorization, and (2) security validation, each of which is described below.

Security Authorization

Prior to allowing a system to become operational, often time organizations wishing to utilize a newly developed or provisioned data analytic computing environment engage a security authorization process which can be focused on testing or assessing the security requirements of an information system. As an example, governmental organizations often engage in the FISMA authorization process described above. A successful assessment can result in the system being granted an Authorization to Operate (ATO). In most cases, the authorization process can be very time consuming and can often delay the end-user operation of a newly created data analytic system by weeks and months past when it is technically ready. In addition, the security assessment performed prior to going operational can be a snapshot in time and may not be able to account for any subsequent changes introduced after the ATO was granted.

Some organizations have accounted for this "snapshot" issue. For instance, the current process used by all departments within the U.S. government is based on the Risk Management Framework (RMF) developed by the National Institute of Standards and Technology (NIST). The RMF can be a lifecycle process and can be designed to be fully integrated with a traditional system development lifecycle (SDLC). While this coupling lends itself to building a better, more secure system, it can still assume a long, deliberate development lifecycle (i.e., waterfall) which struggles to keep up with the todays' need for responsiveness and more agile methods.

The automated provisioning tool described above can be used as a part of the service used to instantiate analytic cells in support of specific projects. In order to realize time and effort savings engendered by an automated provision process, the focus of any authorization effort can be appropriately placed on the generative process that deploys the analytic cells. As an example, there can be two key aspects of what needs to be addressed during a security assessment of an analytic cell generated by the automated provisioning tool: (1) To what extent do the provisioning scripts in the automated provisioning framework build analytic cells in a secure, consistent, and repeatable manner and (2) to what extent do the foundational parts of the analytic cell provide a secure environment that supports the operation of analytic processes and tools.

In addition, the service that deploys and manages the individual analytic cells should be assessed to determine if the processes and procedures used by the service actually operates the project-specific analytic cells in a secure manner and support continuous monitoring. If the Authorization Official can feel comfortable with the security surrounding the processes associated with the automated provisioning technology, then the ability to accept that a newly launched analytic cell is secure—without taking it through a long, tedious assessment—can meet the expectations of an agile development environment. While each instantiation will need to be validated that it was built the same way as previous ones, this validation can be accomplished in a matter of hours to days versus weeks to months because of how the automated provisioning tool is designed to support repeatability and consistency through automation, which is also fully human-readable and verifiable.

The use of an automated analytic cell provisioning framework as described above can help to minimize the amount of time required to stand up a new analytic cell. The automated provisioning framework can use previously validated images—for example, a hardened operating system that complies with security community best practices and prevailing security standards and that can itself be built through an automated process—for the creation of the nodes that make up the analytic cell, thus providing a foundational building block that supports a secure baseline. As part of the provisioning script work flow, at step 208 the automated provisioning framework can launch one or more security processes to validate (from a security standpoint) the analytic cell.

Using the RMF provided by the NIST as an example, the RMF lists an official set of controls that any software system operated by the Federal government should adhere to. The controls within the RMF can be broken down into various different families that can cover a diverse set of security practices that need to be enforced by the analytic cell in order to meet the security needs dictated by the RMF. As an example, the security controls can include such families relating to access control policy and procedures, audit and accountability, and security assessment and authorization. Conventionally, a system administrator upon the creation of an analytic cell would be required to manually check whether each control of the RMF has been complied with. The automated provisioning framework, however, can automatically run a series of tests on the provisioned analytic cell to determine whether or not the analytic cell complies with many of the security protocols outlined in the RMF (i.e., those security controls that are technical in nature).

Figure 5:
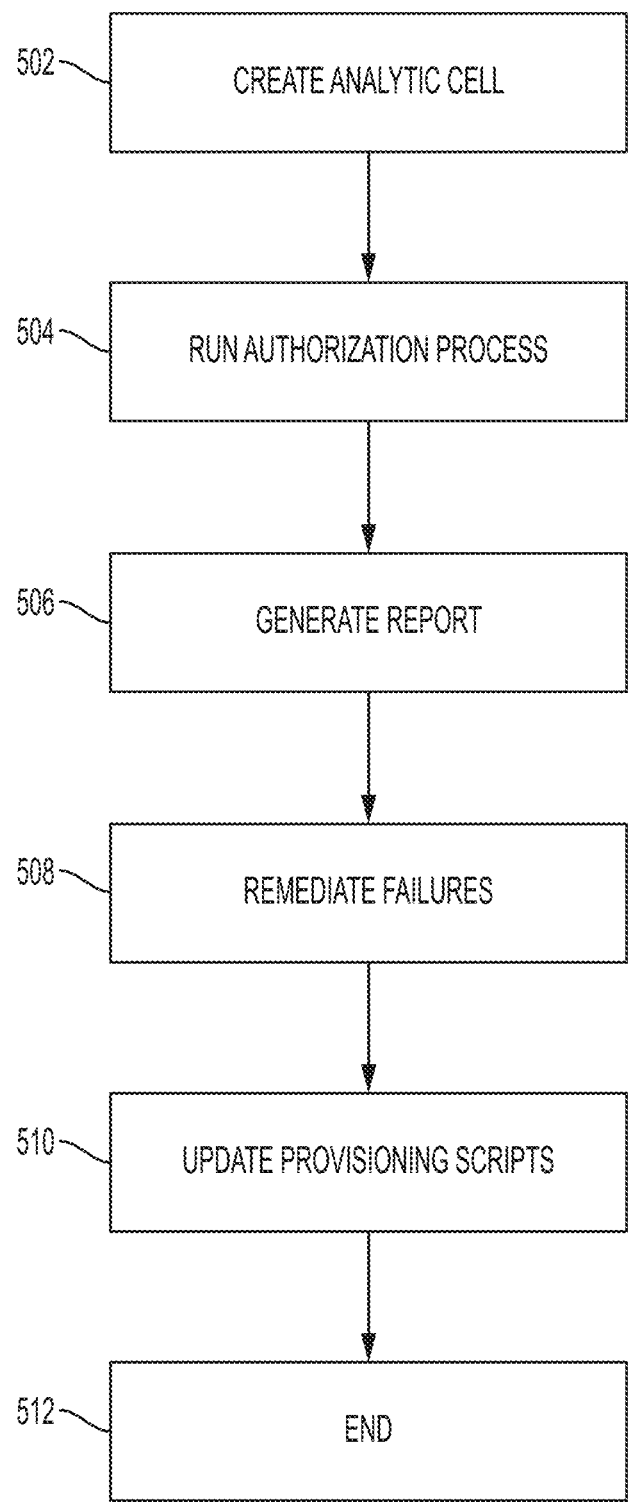
FIG. 5 illustrates an exemplary security authorization process according to examples of the disclosure.

FIG. 5 illustrates an exemplary security authorization process according to examples of the disclosure. The method 500 can begin at step 502, wherein an analytic cell is created using the automated provisioning framework as described above with respect to FIG. 2.

After the analytic cell has been created, the process can move to step 504 wherein the automated provisioning framework utilizes a script to conduct a security validation process. Using the RMF as an example, the automated provisioning framework can, through the use of one or more scripts, run a plurality of tests to determine whether or not the applicable technical security controls have been complied with.

At step 506, the automated provisioning framework can generate a report for consumption by the user that details to what extent the analytic cell complies with the RMF technical security controls and can highlight specific controls within the RMF that the provisioned analytic cell does not comply with.

At step 508, using the generated report, a security professional (i.e, a human user) can remediate any failures indicated by the report either by modifying the analytic cell using the automated provisioning framework to bring it in compliance with the RMF, or remediating the failed control in another manner.

For any modifications that were made to the analytic cell, at step 510, the provisioning scripts used to create the original analytic cell can be updated to include the modifications to analytics created in step 508. Once the script utilized by the automated provisioning framework receives an ATO, the updated script can be used as a baseline by which all other analytic cells can be created. The process can then move to step 512 and end. Since an automated provisioning framework can build an analytic cell in a repeatable manner, if it is known that the provisioning scripts build an analytic cell that is compliant with an enterprise's required technical security controls, then the time it takes to build additional analytic cells can be reduced. In this way, any subsequent analytic cells created by the automated provision will be compliant with an enterprise's required technical security controls. In order to fully support a faster authorization process, it is assumed that those non-technical (i.e., physical, process, and procedural) security controls that support the operation of the analytic cell have already been assessed to be compliant with the RMF.

The analytic environments that are created by the automated provisioning framework can support quick reaction projects where answers are needed in a matter of days to weeks versus months to years. The provisioning templates used by automated provisioning framework can meet the goal of quickly establishing an analytic environment in a very repeatable manner. However, the ability to validate the security requirements in a way that is complimentary to the provisioning timeframe requires a change in philosophy.

Using the automated provisioning framework, and as discussed above, the focus of any authorization effort surrounding an analytic cell can be appropriately placed on the generative process that deploys the analytic cells. In other words, rather than having to validate each newly created analytic cell, if the process by which an analytic cell is created (i.e., the use of the automated provisioning framework) is validated, then the need to perform a formal validation of each analytic cell individually can be all but obviated.

One of the benefits that can be realized from an automated provisioning framework can be the reuse of an exemplar analytic cell that has been approved for use (i.e., the exemplar has successfully undergone a security assessment). This approved version creates a known baseline from which all new instantiations can be compared and measured against. The baseline metrics includes the results from the various security validation tools which can be used against the results from executing the tools against the newly instantiated analytic cell. The key to this model is that the baseline assessment has validated that the provisioning scripts employed by the automated provisioning framework to build the analytic cell, when executed properly, perform a repeatable process and thus creates the exact same environment as the one that was assessed.

Figure 6:
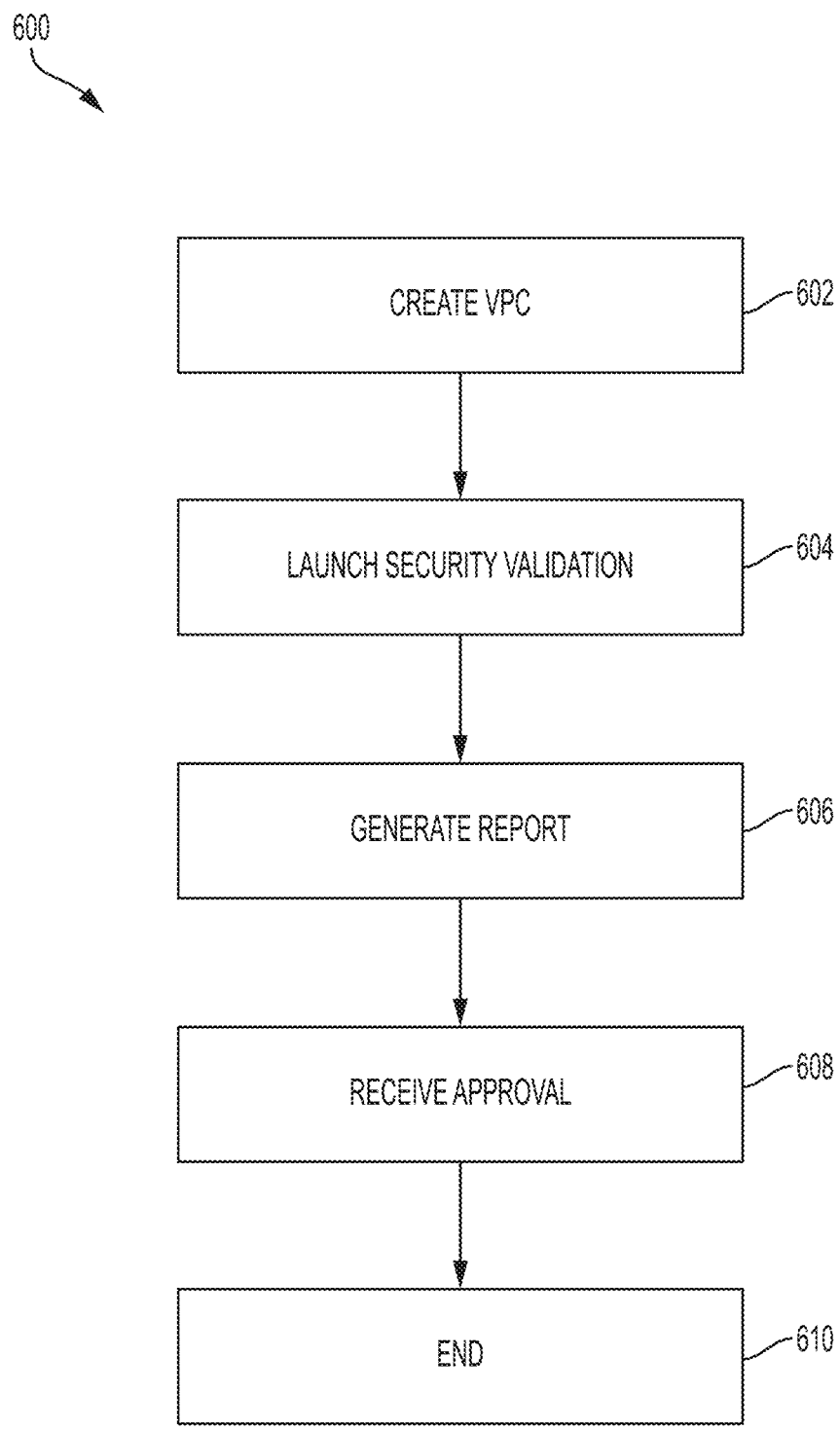
FIG. 6 illustrates an exemplary method for creating an analytic cell using an already approved provisioning baseline according to examples of the disclosure.

Once a baseline script has been established, using the process described above with respect to FIG. 5, the provisioning of a new analytic cell using an already approved baseline script may not need to make any changes to the provisioning scripts of the exemplar cell. FIG. 6 illustrates an exemplary method for creating an analytic cell using an already approved provisioning baseline according to examples of the disclosure. Method 600 can begin at step 602 by the creation of an analytic within a VPC using the provisioning scripts associated with the already established and approved analytic cell baseline as described above. Once the analytic cell has been established at step 602, the method 600 can move to step 604 wherein it can launch a plurality of security tools (described in detail below) to validate the analytic cell from a security standpoint. Examples of the security tools that can be launched include malware detection, security configuration compliance, file integrity checker, and a vulnerability scanner.

Once the security validation process has been completed at step 604, the method 600 can move to step 606 wherein a security report is generated by the automated analytic cell provisioning framework. The automated provisioning framework can collect the results of each of the security validation tools and creates a summary that can be presented for human review. The newly provisioned analytic cell will not be activated, and instead the automated provisioning framework can delay implementation of the analytic cell pending review of the generated report by the human user. At step 608, the automated provisioning framework can receive an approval from the human user, the analytic cell can be made operational, and the process can then move to step 610 and be terminated.

Figure 7:
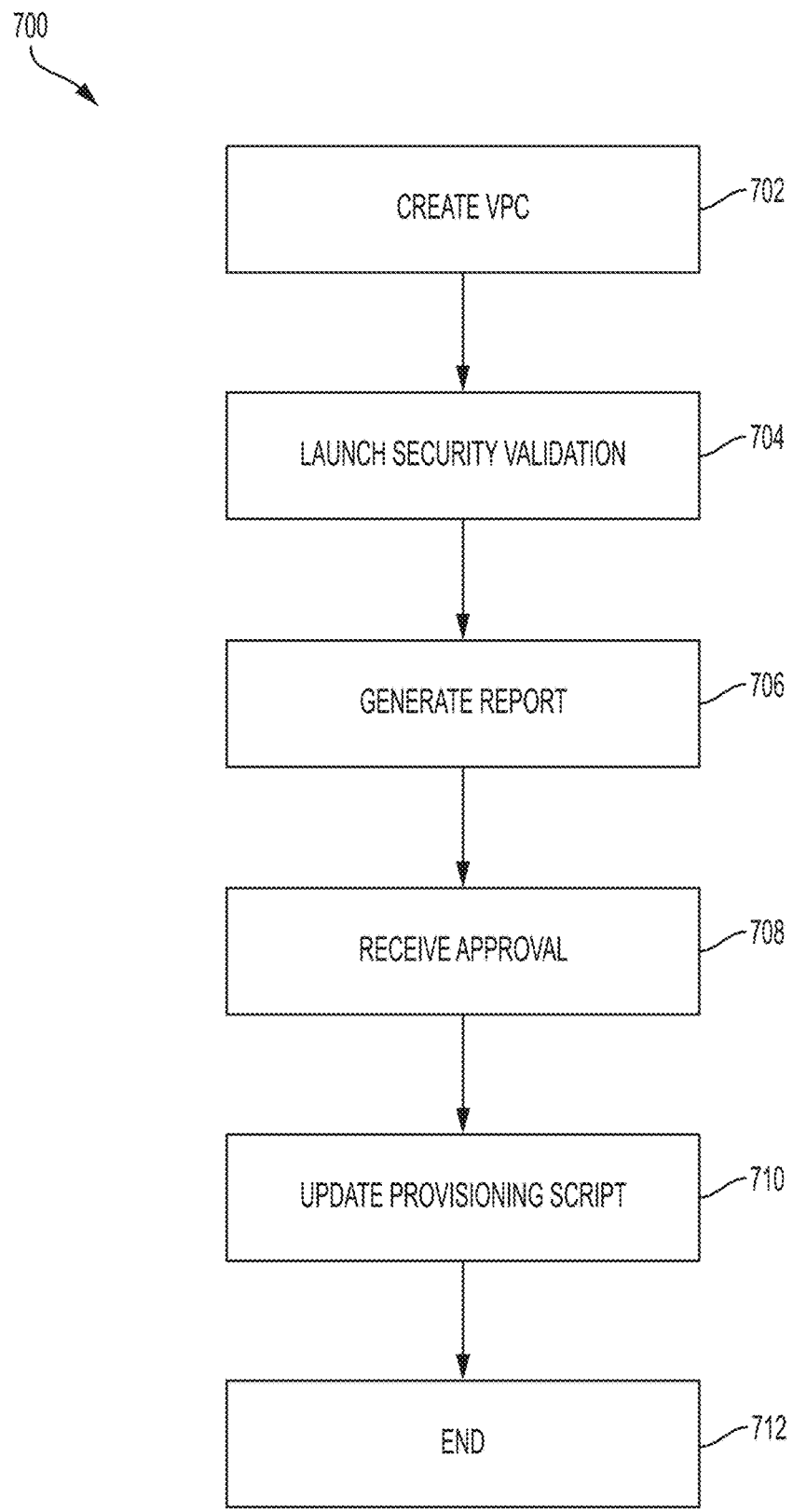
FIG. 7 illustrates an exemplary method of standing up an analytic cell that is modified from an established baseline analytic cell according to examples of the disclosure.

The project that is standing up a new analytic cell using the automated provisioning framework and an established baseline analytic cell may request changes to the analytic cell that deviate from the approved baseline. Examples of the types of changes that might be requested are the addition of analytic applications, the deletion of existing analytic tools, or a change in the number of nodes needed to support the analytic cluster. FIG. 7 illustrates an exemplary method of standing up an analytic cell that is modified from an established baseline analytic cell according to examples of the disclosure. Method 700 can begin at step 702 by the creation of an analytic within a VPC using the provisioning scripts associated with the already established and approved analytic cell baseline as described above. The changes to the baseline analytic cell that the user of the automated provisioning system can then be implemented, either manually, or through the use of a script. Once the analytic cell has been established at step 702, the method 700 can move to step 704 wherein can launch a plurality of security tools (described in detail below) to validate the analytic cell from a security standpoint. Examples of the security tools that can be launched include malware detection, security configuration compliance, file integrity checker, and a vulnerability scanner.

Once the security validation process has been completed at step 704, the method 700 can move to step 706 wherein a security report is generated by the automated analytic cell provisioning framework. The automated provisioning framework can collect the results of each of the security validation tools and creates a summary that can be presented for human review. At this point, the human reviewer can compare these results to those that exist for the approved exemplar instantiation—note that it is expected that there will be differences. The differences can be analyzed to determine the significance of these changes and determine if they introduce new risk. At this point the newly created analytic cell can be in a state of remediation. In other words, the newly provisioned analytic cell may not be activated, and instead the automated provisioning framework can delay implementation of the analytic cell pending review of the generated report by the human user. At step 708, the automated provisioning framework can receive an approval from the human user, the analytic cell can be made operation.

Once the approval has been received at step 708, the process can move to step 710 wherein the provisioning scripts associated with the baseline analytic cell can be updated to include the modifications indicated by the user. In this way, future analytic cells can be created that are identical to the modified analytic cell just newly created. Thus, when future analytic cells are provisioned, the need to engage in the above process can be obviated since the modified baseline has already been validated for a security standpoint, and has received the necessary authorization to operate. Finally, once the provisioning scripts have been updated at step 710, the method 700 can then move to step 712 and be terminated.

Through a learning process, it can be possible to calibrate the orchestration of automated provisioning framework's security validation tools such that specific instances of findings or defined classes of findings can be automatically categorized and acted upon. By realizing thresholds (e.g., programming a condition that if a specific finding is detected with low criticality, it should be handled via setting a particular status), these automated comparisons to known results can allow for predefined action on specific findings or classes of findings. This can allow security professionals to focus on the most important or relevant work while maintaining appropriate awareness of and documentation on all findings.

Security Validation

The Security Validation Process can be critical to the ability to authorize new instantiations of analytic cells created by the automated provisioning framework quickly, as well as to maintain a valid authorization once an analytic cell has become operational. When a new instantiation is provisioned, the initial focus can be on validating that the new instantiation matches that of the previously approved baseline instantiation.

The automated provisioning framework can draw on and orchestrate configuration management tools (such as Ansible™ and Terraform™) to perform the provisioning of the entire secure analytic cell. Terraform can be used to build out the base infrastructure of the environment and then Ansible can be used to deploy the computing instances/hosts along with the specific configurations and applications included with each host. As discussed above, the provisioning can be done using scripts that when executed perform the same function in the same way each time. The scripts are human-readable and their effects are fully traceable. The security validation at initial instantiation can be required to validate that the scripts performed their function as intended with no deviation, which is accomplished through an orchestrated security environment that can be built in to the automated provisioning framework.

The orchestrated security environment construct in the automated provisioning framework consists of tools that provide workflow and event management along with security validation. The orchestrated security environment feature of the automated provisioning framework can employ both a workflow and an event manager that are hooked into the automated provisioning framework and its support for development operations, i.e., DevOps. The event manager can provide the ability to launch the different security validation tools in a prescribed way. As it is modular in nature, additional events can be added as needed which means that additional security validation tools can be added based on what is required for a specific project. The workflow manager takes the results from the different security tools and puts them in a summary format and makes it available for review. It also tracks what the current state is for the security validation process and ensures that it follows a defined flow.

The security validation tools can work to support both a static and dynamic view of the security posture of the analytic cell created by the automated provisioning framework. The types of security checks performed by the tools can include the following: malware detection, static code analysis, security configuration compliance, vulnerability detection, and file integrity checking. The malware detection, security configuration compliance, and file integrity checking tools can be loaded on each host within the analytic cell. The static code analysis tool can be loaded on one specific host where any code to be analyzed will be loaded (i.e., the host that serves as an entry point for approved changes to that environment). The vulnerability detection tool, in some examples, can be centrally hosted, but can be executed against each of the hosts. Because the event manager is modular, additional security tools can be included depending on the specific function desired such as application specific scanning, and new events and workflows created to support specific security or functional needs.

In some examples, the orchestrated security environment tool of the automated provisioning framework can employ third-party security software as part of the security validation process. Because the automated provisioning framework is an extensible platform, the specific tools listed below, are meant as examples only, and could be replaced by different tools that perform the same or similar function. In one example, JIRA™ can be used as the workflow manager and StackStorm™ as the event manager. The static security validation tools can include ClamAV™ for malware detection, FindBugs™ for static Java code analysis, and OpenSCAP™ as a security configuration compliance tool. The dynamic tools can consist of Advanced Intrusion Detection Environment (AIDE™) for file integrity checking and OpenVAS™ as a vulnerability scanner.

In some examples, the automated provisioning framework can be configured to enable the insertion of specialized cybersecurity capabilities (e.g., automated memory map randomization, dynamic remote IP routing, user-class behavior pattern detection) in an agile way during provisioning—as part of the product roadmap.

Change Management

After provisioning an analytic cell using the automated provisioning framework, a user of the analytic cell may wish to modify the analytic cell in some way. As an example, the user may wish to scale up the analytic cell, in other words add additional computing capacity to the analytic cell or increase the amount of data stored in the analytic cell.

Figure 8:
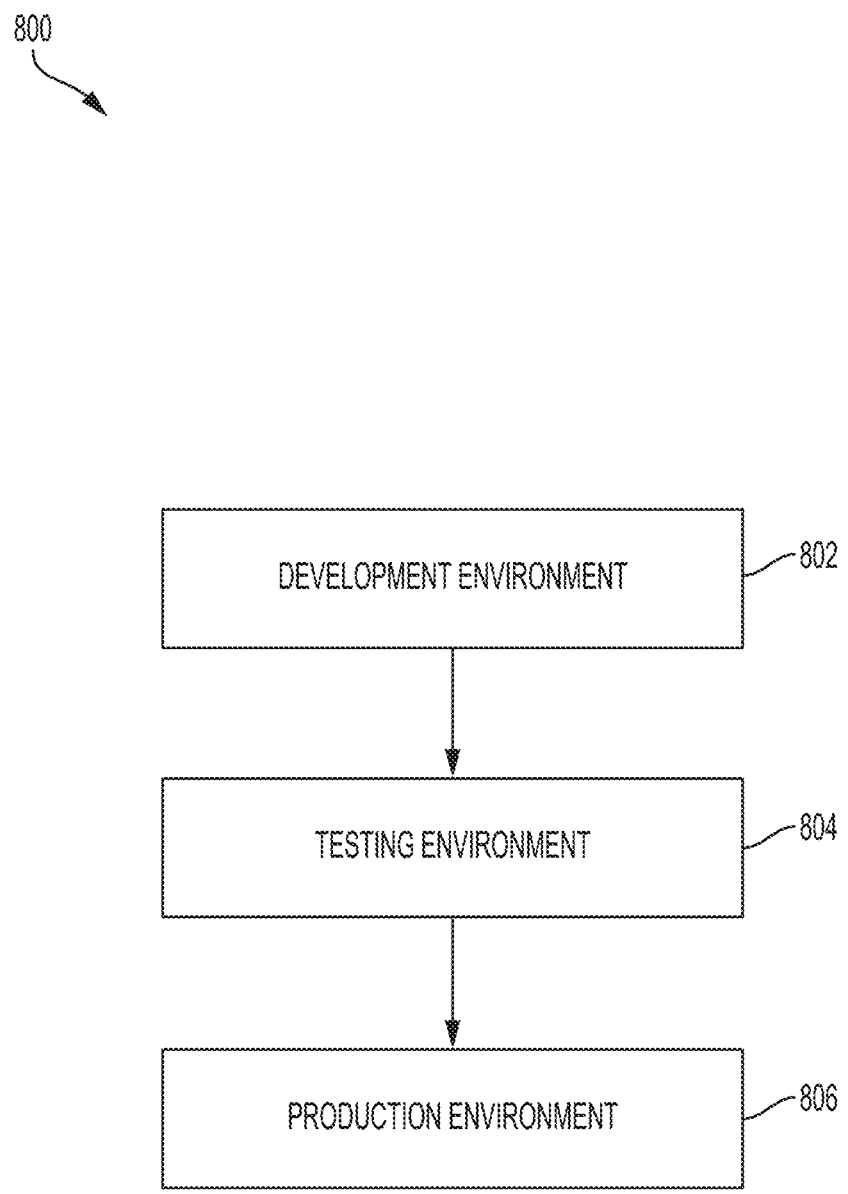
FIG. 8 illustrates an exemplary analytic cell development process according to example of the disclosure.

Conventionally, the modification of an analytic cell or any computing system can be accomplished through the use of parallel environments that can be used to manage the integration of new software into the computing system. As an example, an enterprise can utilize a development environment, a test environment, and a production environment to integrate new software into a computing environment. FIG. 8 illustrates an exemplary analytic cell development process according to example of the disclosure.

The method 800 can begin at step 802 wherein any new software or modification can be developed in a development environment. The development environment can be the environment that replicates the production environment (described below) in which changes to the software can be developed and initially checked to ensure that the changes do not negatively impact the computing environment. In some examples, the development environment can be housed on a user's local computer or cloud service provider and can include development tools such as a compiler, an integrated development environment, and/or different additional versions of libraries and support software used to support the development process. A developer can use the development environment to introduce new software or system changes into the computing environment. As an example, the developer can download new software to be eventually employed into a computing environment. Since the development environment is substantially identical to the production environment (i.e., the environment that is currently operational in the real-world), any changes in the development environment that cause problems or errors with the environment will likely trigger the same problems if introduced in the production environment.

Once a developer is satisfied that the modifications to the development environment that they introduced are operating as planned without causing system errors, the process can move to step 804 wherein the modified computing environment is introduced into the testing environment. The testing environment can allow either automated tests or human testers to exercise new and changed code. The modified code can be put through a battery of tests to fully vet the ability of the modifications to function in a real-world use case. Like the development environment, the testing environment can replicate the production environment with the only change being the modification that the developer is seeking to introduce. In contrast to the development environment which can exist to allow the developer to introduce modifications into the computing environment for functionality, the testing environment can exist to allow the developer to determine if the modified code is "real-world" ready.

Once the code has been vetted in the testing environment as described above, the process can move to step 806 wherein the modified code is introduced into the production environment. The production environment can represent the "live" environment in which customers/users directly interact.

The automated provisioning framework can be configured to develop modifications to the analytic cell through the development, testing, and production environment paradigm described above. Specifically, the automated provisioning framework can support the use of three separate analytic cells (i.e., development, test, and production) as described for each unique project.

The automated provisioning framework can include a change management workflow, configured to work in the environments described above. The change management workflow can support the implementation of changes to the testing or production environments. The changes can come in the form of the addition of a new application, external analytic code, or upgrades to existing applications and/or code, as examples.

Figure 9:
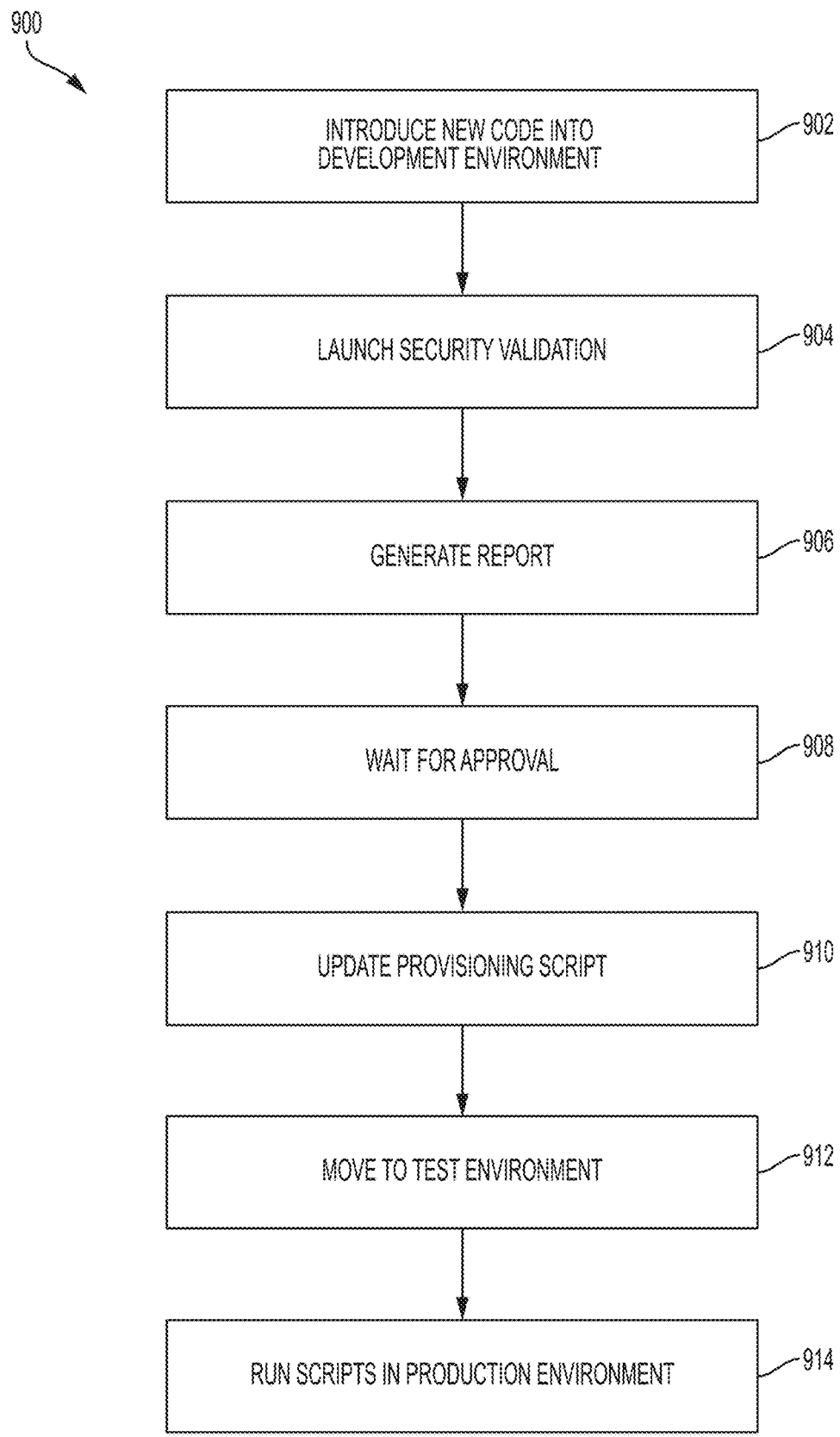
FIG. 9 illustrates an exemplary change management workflow according to examples of the disclosure.

FIG. 9 illustrates an exemplary change management workflow according to examples of the disclosure. The method 900 can begin at step 902 wherein a modification or new code is introduced to the development environment. In one example, the new application/code that is desired to ultimately be introduced into the production environment can be initially introduced into the development environment and onto a specific staging server within the development environment. As with any new software that is introduced into an analytic cell provisioned using the automated provisioning framework, the automated provisioning framework can launch, at step 904, one or more security tools to determine if the new code is safe to introduce into the environment. As an example, the one or more security tools can include malware detection and any static code analysis.

At step 906, the automated provisioning framework can collect the results of each of the security validation tools and generate a summary that can be made available for human review. At step 908, the method can wait for approval or remediation of any problems contained within the report. If the human (security professional) finds any issues within the summarized results, then then the error can be remediated. The state of the modifications seeking to be introduced can remain in remediation until all issues are resolved. If the results of the security validation tools are determined to be acceptable, the method 900 can move to the next step.

At step 910, the provisioning scripts associated with the development environment can be modified to reflect the desired changes to the computing environment. The process can then move to step 912, wherein the updated provisioning scripts are then moved into the test environment and executed, thus allowing the changes to be integrated into the test environment and evaluated. Since the test environment is pre-existing, when the provisioning scripts are run, any provisioning of software that already exists in the test environment can be ignored, thereby allowing for only the modifications to be added to the pre-existing test environment. As with the launching of a new instantiation of an analytic cell, the provisioning scripts can kick off the same workflow previously described above that allowed for the establishment of a new baseline (e.g., the security authorization process).

Once the workflow within the test environment has arrived at a state of approved, then the updated provisioning scripts are then moved to the production environment at step 914 and executed, thus allowing the changes to be integrated into the production environment. The executing of provisioning scripts within the production environment can kick off the new analytic cell instantiation workflow (described above) with the intent of validating that what was approved in the test environment has been successfully moved into the production environment.

In summary, throughout the development lifecycle, the automated provisioning framework's support for DevOps and automated deployment/security validation can allow for a responsive change management process that takes known good templates, makes needed changes and validates those changes, meets risk management expectations, and then propagates them as updated templates through to production following approved protocol.

Figure 10:
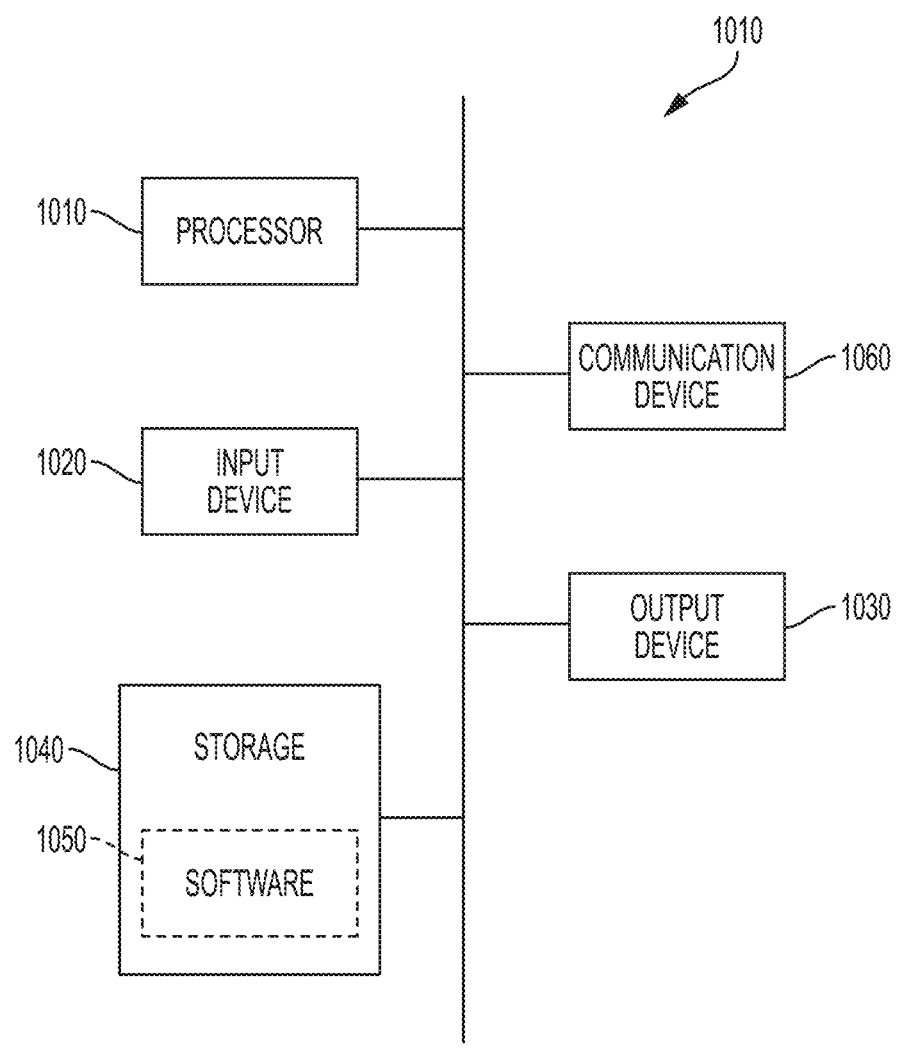
FIG. 10 illustrates an example of a computing device in accordance with one embodiment.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server. The device can include, for example, one or more of processor 1010, input device 1020, output device 1030, storage 1040, and communication device 1060. Input device 1020 and output device 1030 can generally correspond to those described above, and can either be connectable or integrated with the computer.

Input device 1020 can be any suitable device that provides input, such as a command line interface, keyboard or keypad, mouse. Output device 1030 can be any suitable device that provides output, such as a screen, haptics device, or speaker.

Storage 1040 can be any suitable device that provides storage, such as an electrical, magnetic or optical memory including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as Ethernet.

Device 1000 can implement any operating system suitable for operating on the network. Software 1050 can be written in any suitable programming language, such as Yaml, Java or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A method for provisioning a plurality of secure analytic cells using an automated provisioning framework, the method comprising:
   receiving one or more specifications of a first analytic cell, wherein an analytic cell includes one or more virtual assets collectively configured to process one or more data sets;
   configuring one or more provisioning scripts based on the received one or more specifications of the analytic cell, wherein the one or more provisioning scripts are configured to instantiate the first analytic cell on a cloud computing environment;
   executing the one or more provisioning scripts on the cloud computing environment to generate the first analytic cell on the cloud computing environment, wherein executing the one or more provisioning scripts on the cloud computing environment to generate the first analytic cell includes selecting and installing one or more software programs on the first analytic cell based on the received one or more specifications of the analytic cell;
   executing one or more security control tests on the provisioned first analytic cell;
   generating a security report on the first analytic cell, wherein the security report is based on one or more results of the one or more security control tests;
   receiving an approval of the provisioned first analytic cell, wherein the approval is based on the generated security report;
   configuring the first analytic cell to be available to a plurality of users based on the received approval;
   executing the one or more provisioning scripts on the cloud computing environment to generate a second analytic cell on the cloud computing environment; and
   configuring the second analytic cell to be available to a plurality of users based on the received approval of the provisioned first analytic cell.

2. The method of claim 1, wherein executing the one or more provisioning scripts on the cloud computing environment to generate the first analytic cell on the cloud computing environment includes creating a virtual private cloud (VPC) on the cloud service provider, and wherein creating the VPC includes subdividing the VPC into one or more zones, and wherein each zone is assigned to one or more internet protocol (IP) addresses.

3. The method of claim 2, wherein executing the one or more provisioning scripts on the cloud computing environment to generate the first analytic cell on the cloud computing environment includes requesting the cloud service provider to generate one or more hosts to be created on the VPC, wherein each host is assigned to the one or more zones of the VPC, and wherein each host is configured based on the received one or more specifications of a first analytic cell.

4. The method of claim 3, wherein each host is assigned an IP address that corresponds to an IP address of the one or more IP address of the zone to which the host is assigned.

5. The method of claim 3, the method further comprising applying one or more tags to each host, wherein applying the one or more tags is based on the received one or more specifications of a first analytic cell.

6. The method of claim 5, wherein executing the one or more provisioning scripts on the cloud computing environment to generate the first analytic cell on the cloud computing environment includes selecting and installing one or more software programs on each host in the VPC based on the host's tags, wherein the selection of the one or more programs is based on the received one or more specifications of a first analytic cell.

7. The method of claim 1, wherein generating a security report on the first analytic cell includes aggregating the one or more results of the one or more security control tests into the generated security report.

8. A method for provisioning a plurality of analytic cells based on a previously established production environment analytic cell generated by an automated provisioning framework, wherein an analytic cell includes one or more virtual assets collectively configured to process one or more data sets, the method comprising:
- generating one or more modifications to a development environment analytic cell, wherein the development environment analytic cell is based on the previously established production environment analytic cell;
- performing one or more security control tests upon the modified development environment analytic cell;
- generating a security report on the modified development environment analytic cell, wherein the security report is based on one or more results of the one or more security validations;
- receiving an approval of the modified development environment analytic cell, wherein the approval is based on the generated security report and a prior approval of the previously established production environment;
- updating one or more provisioning scripts associated with the previously established production environment analytic cell, wherein the updates to the one or more provisioning scripts are based on the one or more modifications made to the development environment analytic cell; and
- executing the updated one or more provisioning scripts in a production environment located within a cloud computing environment, wherein the execution of the updated one or more provisioning scripts modifies the previously established production environment analytic cell, and wherein the modified analytic cell in the production environment is configured to be available to a plurality of users, and wherein executing the one or more provisioning scripts on the cloud computing environment to generate the first analytic cell includes selecting and installing one or more software programs on the first analytic cell based on the received one or more specifications of the analytic cell;
- executing the updated provisioning scripts on the cloud computing environment to generate a second analytic cell on the cloud computing environment; and
- configuring the second analytic cell to be available to a plurality of users based on the received approval of the modified analytic cell.

9. The method of claim 8, wherein executing the updated one or more provisioning scripts on the cloud computing environment to generate the first analytic cell on the cloud computing environment includes creating a virtual private cloud (VPC) on the cloud service provider, and wherein creating the VPC includes subdividing the VPC into one or more zones, and wherein each zone is assigned to one or more internet protocol (IP) addresses.

10. The method of claim 9, wherein executing the updated one or more provisioning scripts on the cloud computing environment includes requesting the cloud service provider to generate one or more hosts to be created on the VPC, wherein each host is assigned to the one or more zones of the VPC, and wherein each host is configured based on the received one or more specifications of a first analytic cell.

11. The method of claim 10, wherein each host is assigned an IP address that corresponds to an IP address of the one or more IP address of the zone to which the host is assigned.

12. The method of claim 10, the method further comprising applying one or more tags to each host, wherein applying the one or more tags is based on the received one or more specifications of a first analytic cell.

13. The method of claim 10, wherein executing the updated one or more provisioning scripts on the cloud computing environment includes selecting and installing one or more software programs on each host in the VPC, wherein the selection of the one or more programs is based on the received one or more specifications of a first analytic cell.

14. The method of claim 8, wherein generating a security report on the modified development environment analytic cell includes aggregating the one or more results of the one or more security control tests into the generated security report.

15. A non-transitory computer readable storage medium storing one or more programs for provisioning a plurality of secure analytic cells using an automated provisioning framework, wherein an analytic cell includes one or more virtual assets collectively configured to process one or more data sets the one or more programs comprising instructions, which when executed by an electronic device, cause the device to:
- receive one or more specifications of a first analytic cell;
- configure one or more provisioning scripts based on the received one or more specifications of the analytic cell, wherein the one or more provisioning scripts are configured to instantiate the first analytic cell on a cloud computing environment;
- execute the one or more provisioning scripts on the cloud computing environment to generate the first analytic cell on the cloud computing environment, wherein executing the one or more provisioning scripts on the cloud computing environment to generate the first analytic cell includes selecting and installing one or more software programs on the first analytic cell based on the received one or more specifications of the analytic cell;
- execute one or more security control tests on the provisioned first analytic cell;
- generate a security report on the first analytic cell, wherein the security report is based on one or more results of the one or more security control tests;
- receive one or more modifications to the first analytic cell, wherein the one or more modifications are based on the generated security report;
- update the one or more provisioning scripts based on the received one or more modifications to the first analytic cell;
- receive an approval of the provisioned first analytic cell, wherein the approval is based on the generated security report;
- configure the first analytic cell to be available to a plurality of users based on the received approval;
- execute the one or more provisioning scripts on the cloud computing environment to generate a second analytic cell on the cloud computing environment; and
- configure the second analytic cell to be available to a plurality of users based on the received approval of the provisioned first analytic cell.

16. The non-transitory computer readable storage medium of claim 15, wherein executing the one or more provisioning scripts on the cloud computing environment to generate the first analytic cell on the cloud computing environment includes creating a virtual private cloud (VPC) on the cloud service provider, and wherein creating the VPC includes subdividing the VPC into one or more zones, and wherein each zone is assigned to one or more internet protocol (IP) addresses.

17. The non-transitory computer readable storage medium of claim 16, wherein executing the one or more provisioning scripts on the cloud computing environment to generate the first analytic cell on the cloud computing environment includes requesting the cloud service provider to generate one or more hosts to be created on the VPC, wherein each host is assigned to the one or more zones of the VPC, and wherein each host is configured based on the received one or more specifications of a first analytic cell.

18. The non-transitory computer readable storage medium of claim 17, wherein each host is assigned an IP address that corresponds to an IP address of the one or more IP address of the zone to which the host is assigned.

19. The non-transitory computer readable storage medium of claim 17, wherein the device is further caused to apply one or more tags to each host, wherein applying the one or more tags is based on the received one or more specifications of a first analytic cell.

20. The non-transitory computer readable storage medium of claim 17, wherein executing the one or more provisioning scripts on the cloud computing environment to generate the first analytic cell on the cloud computing environment includes selecting and installing one or more software programs on each host in the VPC, wherein the selection of the one or more programs is based on the received one or more specifications of a first analytic cell.

21. The non-transitory computer readable storage medium of claim 15, wherein generating a security report on the first analytic cell includes aggregating the one or more results of the one or more security control tests into the generated security report.

22. A non-transitory computer readable storage medium storing one or more programs for provisioning a plurality of analytic cells based on a previously established production environment analytic cell generated by an automated provisioning framework, wherein an analytic cell includes one or more virtual assets collectively configured to process one or more data sets, the one or more programs comprising instructions, which when executed by an electronic device, cause the device to:
generate one or more modifications to a development environment analytic cell, wherein the development environment analytic cell is based on the previously established production environment analytic cell;
perform one or more security control tests upon the modified development environment analytic cell;
generate a security report on the modified development environment analytic cell, wherein the security report is based on one or more results of the one or more security validations;
receive an approval of the modified development environment analytic cell, wherein the approval is based on the generated security report and a prior approval of the previously established production environment;
update one or more provisioning scripts associated with the previously established production environment analytic cell, wherein the updates to the one or more provisioning scripts are based on the one or more modifications made to the development environment analytic cell; and
execute the updated one or more provisioning scripts in a production environment located within a cloud computing environment, wherein the execution of the updated one or more provisioning scripts modifies the previously established production environment analytic cell, and wherein the modified analytic cell in the production environment is configured to be available to a plurality of users, and wherein executing the one or more provisioning scripts on the cloud computing environment to generate the first analytic cell includes selecting and installing one or more software programs on the first analytic cell based on the received one or more specifications of the analytic cell;
execute the updated provisioning scripts on the cloud computing environment to generate a second analytic cell on the cloud computing environment; and
configure the second analytic cell to be available to a plurality of users based on the received approval of the modified analytic cell.

23. The non-transitory computer readable storage medium of claim 22, wherein executing the updated one or more provisioning scripts on the cloud computing environment to generate the first analytic cell on the cloud computing environment includes creating a virtual private cloud (VPC) on the cloud service provider, and wherein creating the VPC includes subdividing the VPC into one or more zones, and wherein each zone is assigned to one or more internet protocol (IP) addresses.

24. The non-transitory computer readable storage medium of claim 23, wherein executing the updated one or more provisioning scripts on the cloud computing environment includes requesting the cloud service provider to generate one or more hosts to be created on the VPC, wherein each host is assigned to the one or more zones of the VPC, and wherein each host is configured based on the received one or more specifications of a first analytic cell.

25. The non-transitory computer readable storage medium of claim 24, wherein each host is assigned an IP address that corresponds to an IP address of the one or more IP address of the zone to which the host is assigned.

26. The non-transitory computer readable storage medium of claim 24, wherein the device is further caused to apply one or more tags to each host, wherein applying the one or more tags is based on the received one or more specifications of a first analytic cell.

27. The non-transitory computer readable storage medium of claim 24, wherein executing the updated one or more provisioning scripts on the cloud computing environment includes selecting and installing one or more software programs on each host in the VPC, wherein the selection of the one or more programs is based on the received one or more specifications of a first analytic cell.

28. The non-transitory computer readable storage medium of claim 22, wherein generating a security report on the modified development environment analytic cell includes aggregating the one or more results of the one or more security control tests into the generated security report.

* * * * *